(12) United States Patent
Gupta et al.

(10) Patent No.: US 7,263,331 B2
(45) Date of Patent: Aug. 28, 2007

(54) METHOD AND APPARATUS FOR SHARING A BLUETOOTH MODULE WITH TWO COMPUTING DEVICES

(75) Inventors: Vivek G. Gupta, Portland, OR (US); James Kardach, Saratoga, CA (US); Brian V. Belmont, West Linn, OR (US); Muthu K. Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 662 days.

(21) Appl. No.: 10/663,196

(22) Filed: Sep. 15, 2003

(65) Prior Publication Data

US 2005/0059346 A1 Mar. 17, 2005

(51) Int. Cl.
*H04B 7/00* (2006.01)

(52) U.S. Cl. ............... 455/41.2; 455/556.1; 455/557; 370/338; 370/328; 370/401; 340/7.6; 340/825.19; 713/168

(58) Field of Classification Search .......... 455/41.2, 455/556.1, 557; 340/407.1; 713/170, 300
See application file for complete search history.

(56) References Cited

U.S. PATENT DOCUMENTS

| | | | |
|---|---|---|---|
| 6,452,910 B1 * | 9/2002 | Vij et al. ............... | 370/310 |
| 6,775,258 B1 * | 8/2004 | van Valkenburg et al. .. | 370/338 |
| 6,816,925 B2 * | 11/2004 | Watts, Jr. ................ | 710/36 |
| 6,885,847 B1 * | 4/2005 | Lumelsky ................ | 455/41.2 |
| 6,937,579 B2 * | 8/2005 | Bantz et al. ............. | 370/312 |
| 6,940,813 B2 * | 9/2005 | Ruutu .................... | 370/231 |
| 6,961,541 B2 * | 11/2005 | Overy et al. ............ | 455/41.2 |
| 6,993,358 B2 * | 1/2006 | Shiotsu et al. .......... | 455/552.1 |
| 6,999,721 B2 * | 2/2006 | Ollis et al. .............. | 455/41.2 |
| 7,039,358 B1 * | 5/2006 | Shellhammer et al. ..... | 455/41.2 |
| 7,042,866 B2 * | 5/2006 | Famolari ................. | 370/338 |
| 7,046,961 B2 * | 5/2006 | Park ....................... | 455/41.2 |
| 7,092,671 B2 * | 8/2006 | Lunsford et al. ......... | 455/41.2 |
| 7,103,359 B1 * | 9/2006 | Heinonen et al. ........ | 455/436 |
| 7,107,010 B2 * | 9/2006 | Heinonen et al. ........ | 455/41.2 |

* cited by examiner

*Primary Examiner*—Marceau Milord
(74) *Attorney, Agent, or Firm*—Blakely, Sokoloff, Taylor & Zafman LLP

(57) ABSTRACT

A method and apparatus for a user to interface with a mobile computing device is disclosed. In one embodiment, a method comprises sharing a Bluetooth communications module between a primary processor system and a secondary processor system.

55 Claims, 9 Drawing Sheets

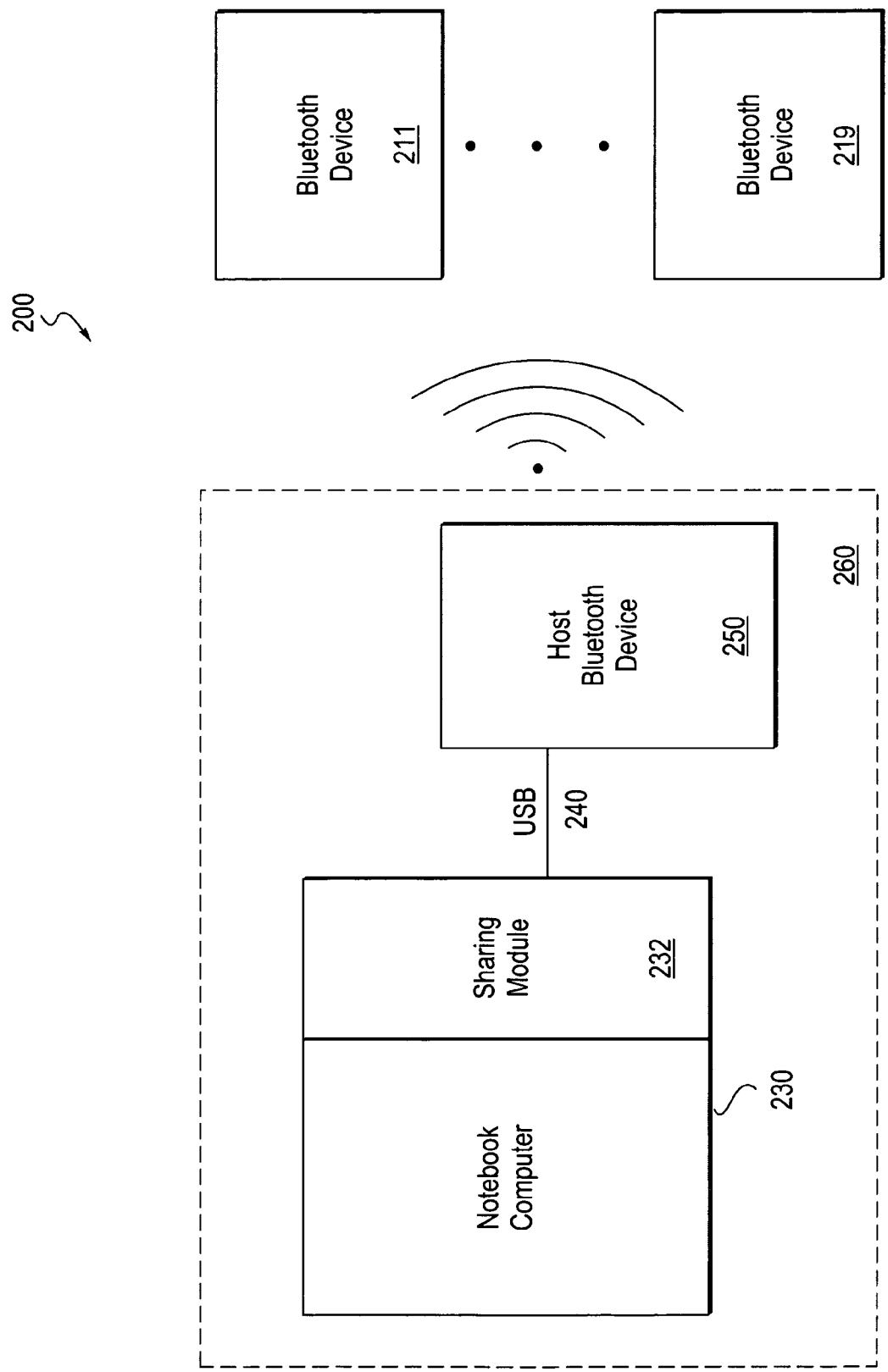

METHOD AND APPARATUS FOR SHARING A BLUETOOTH MODULE WITH TWO COMPUTING DEVICES

FIELD OF THE INVENTION

This invention relates to computer software and hardware, and more specifically to a method and apparatus for sharing a Bluetooth host controller module with two computing devices.

BACKGROUND OF THE INVENTION

As electronic and computer technology continues to evolve, communication of information to a user at all times becomes increasingly important. For example, now more than ever users of personal digital assistants (PDAs) are continuously checking email, looking-up contacts, drafting documents on-the-go, and scheduling. Other users are utilizing mobile phones with built-in PDAs. In addition to these new devices, more and more users are using tablet PCs and notebook computers. The mobility of the powerful computing devices makes them ideal for the business traveler. A general computing system for a mobile device will now be described.

A. Computing System

FIG. 1A shows an embodiment of a mobile computing system 100. The computing system includes a Central Processing Unit (CPU) 101, a cache 102, a memory controller and bridge 103 and a system memory 104. Software instructions performed by the computing system (and its corresponding data) are stored in the system memory 104 and cache 102 (where frequently used instructions and data are stored in cache 102). The software instructions (together with corresponding data) are executed by the CPU 101. The memory controller portion of the memory controller and bridge function 103 is responsible for managing access to the system memory 104 (which may be used by functional elements other than the CPU 101 such as the graphics controller 105 and various I/O units).

The graphics controller 105 and display 106 provide the computer generated images observed by the user of the computing system 100. The bridge portion of the memory controller and bridge function 103 provides a system bus 107 that multiple Input/Output (I/O) units $108_1$ through $108_N$ may use to communicate with one another, the CPU 101, the system memory 104, etc. I/O buses $109_1$ through $109_N$ also interconnects I/O units 108, through $108_N$ to the system bus 107. Here, I/O units are typically viewed as functional units that send/receive information to/from the computing system (e.g., a networking adapter, a MODEM, a wireless interface, a keyboard, a mouse, etc.) and/or function units used for storing information within the computing system 100 (e.g., a hard disk drive unit). Note that the depiction of FIG. 1A is exemplary and other computing system architectures are possible (e.g., multiprocessor computing systems, for example).

Buses 107 and $109_1$, through $109_N$ may be bus structures, such as a Universal Serial Bus (USB) bus, in order to couple a keyboard, mouse and other lower performance peripherals. Also, "parallel" and/or "serial" ports (not shown in FIG. 1A for simplicity) may also be viewed as additional I/O units.

B. Bluetooth Wireless Network

FIG. 1B illustrates a prior art wireless network 1000. Network 1000 includes a mobile computing system 1100, such as described illustrated in FIG. 1A. Computing system 1100 communicates with multiple Bluetooth enabled devices, such as mobile phone 1300, personal digital assistant (PDA) 1200, or similar multifunction Bluetooth enabled device.

Mobile computing system 1100 communicates with Bluetooth devices 1200 and 1300 using Universal Serial Bus (USB) Bluetooth Adapter 1140, Personal Computer Memory Card International Association (PCMCIA) Bluetooth card 1120, or an internal Bluetooth adapter.

Bluetooth is a computing and telecommunications industry specification that describes how mobile phones, computers, and PDAs can easily interconnect with each other and with home and business phones and computers using a short-range wireless connection. Using this technology, users of cellular phones, pagers, and personal digital assistants such as the PalmPilot will be able to buy a three-in-one phone that can double as a portable phone at home or in the office, get quickly synchronized with information in a desktop or notebook computer, initiate the sending or receiving of a fax, initiate a print-out, and, in general, have all mobile and fixed computer devices be totally coordinated.

Bluetooth requires that a low-cost transceiver chip be included in each device. The transceiver transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be exchanged at a rate of 1 megabit per second (up to 2 Mbps in the second generation of the technology). A frequency hop scheme allows devices to communicate even in areas with a great deal of electromagnetic interference. Built-in encryption and verification is provided.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 2 illustrates an exemplary diagram of a Bluetooth network according to one embodiment of the present invention.

DETAILED DESCRIPTION

Figure 1A:
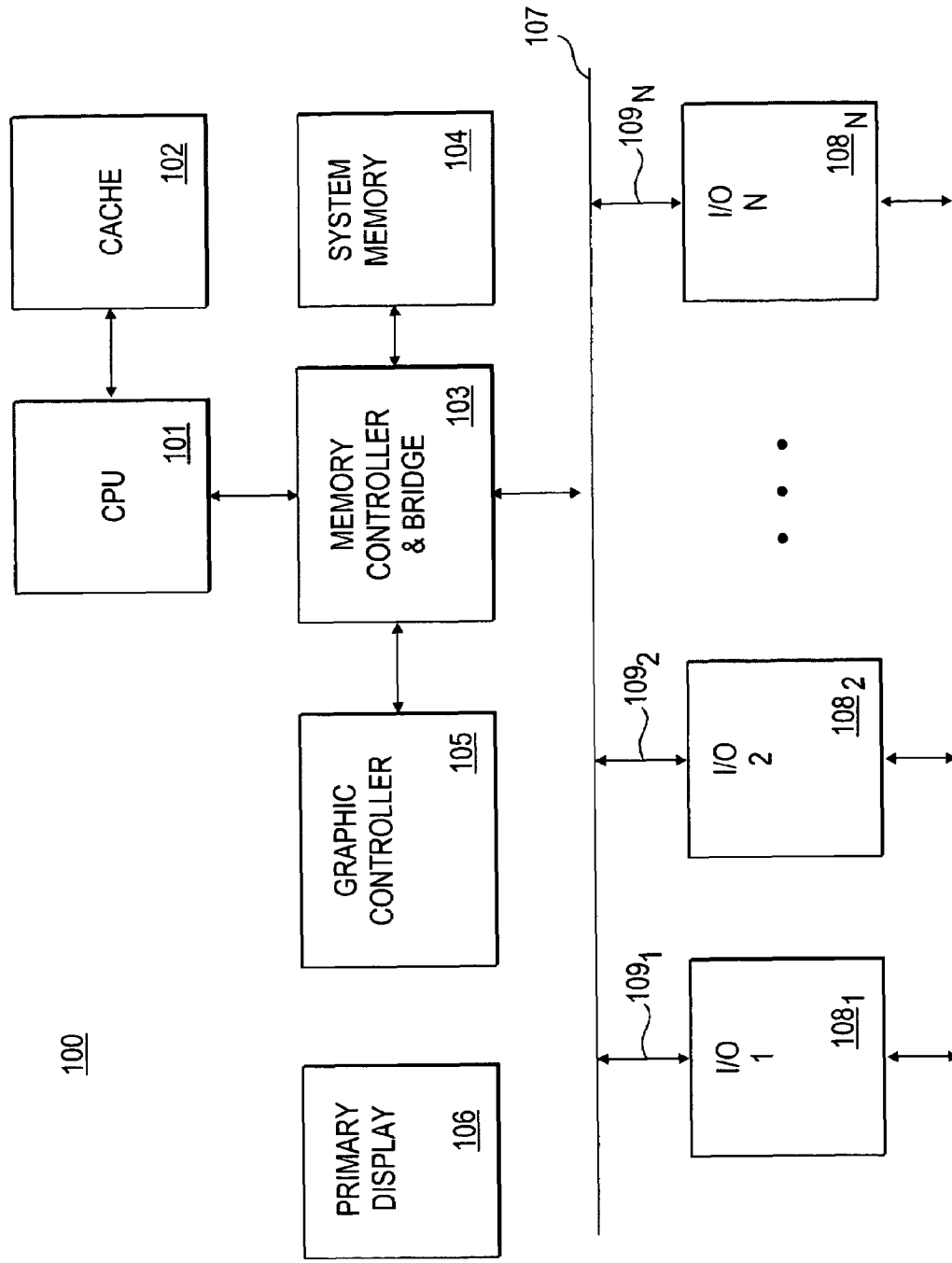
FIG. 1A illustrates an embodiment of a mobile computing system.
Figure 1B:
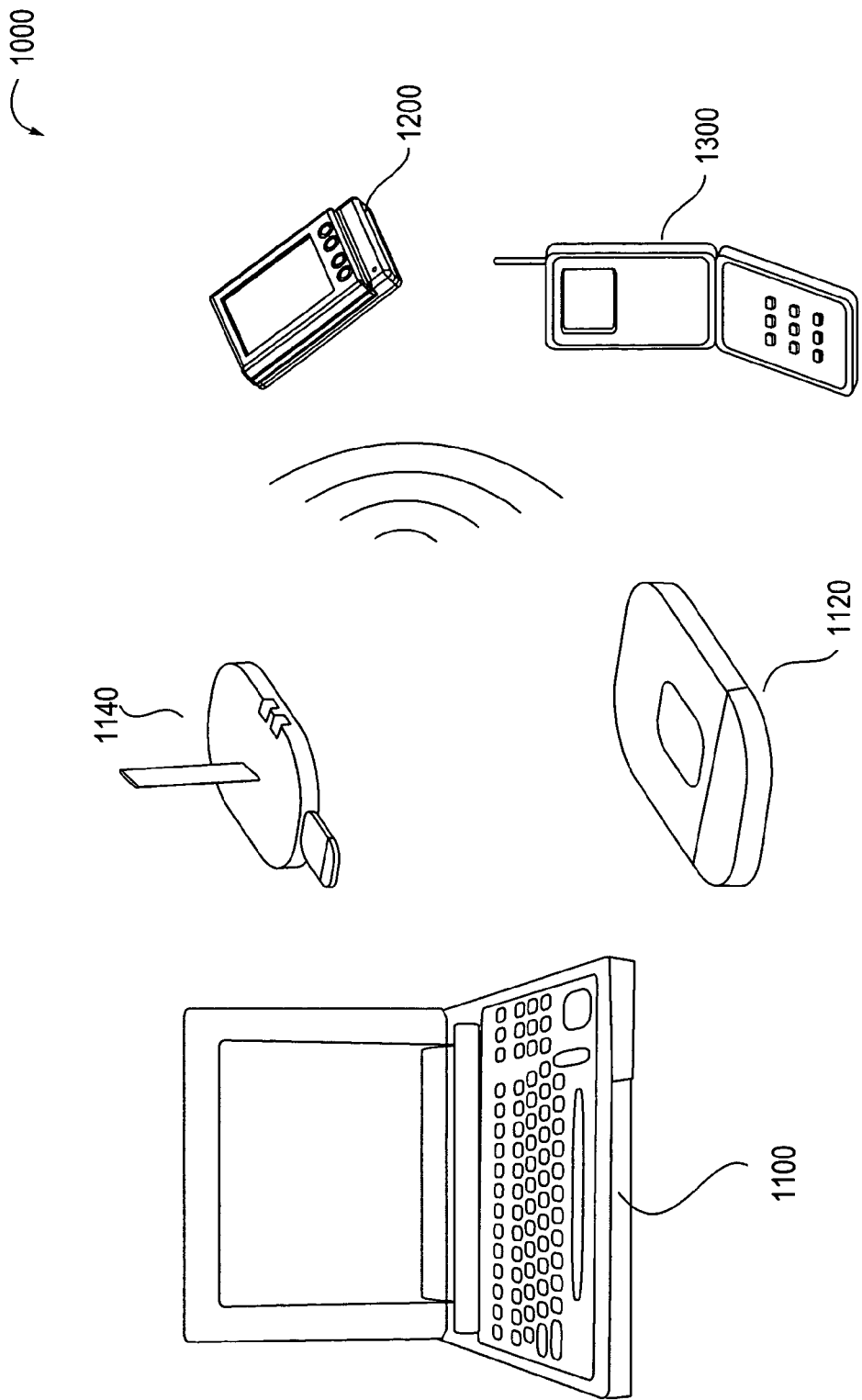
FIG. 1B illustrates a prior art wireless network.

A method and apparatus for a Method And Apparatus For Sharing A Bluetooth Module With Two Computing Devices is disclosed. In one embodiment, a method comprises sharing a Bluetooth communications Host Controller module between a primary processor system and a secondary processor system.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below.

FIG. 2 illustrates an exemplary diagram of a Bluetooth network 200 according to one embodiment of the present invention. Network 200 includes a computer system 230 connected to a host Bluetooth computing device 250 via USB cable 240. Computer system 230 is not Bluetooth enabled. Device 250 can be any multi-function Bluetooth enabled device such as a mobile phone or PDA.

Computer 230 includes a Bluetooth sharing module 232 that allows the computer 230 to control the Bluetooth functionality of host device 250. In other words, the non-Bluetooth enabled computer 230 becomes a Bluetooth enabled computer 260 that communicates with Bluetooth devices 211-219. Sharing module 232 includes software drivers that allow both the processor in computer 230 and in the processor in host device 250 to control the Bluetooth functionality of host device 250. Although USB cable 240 is shown in FIG. 2, the link can also be an RS-232 cable, firewire or similar high speed link. In another embodiment, sharing module 232 is included in host device 250. Additionally, sharing module 232 can stand alone with interfaces to both computer 230 and host device 250.

Figure 3:
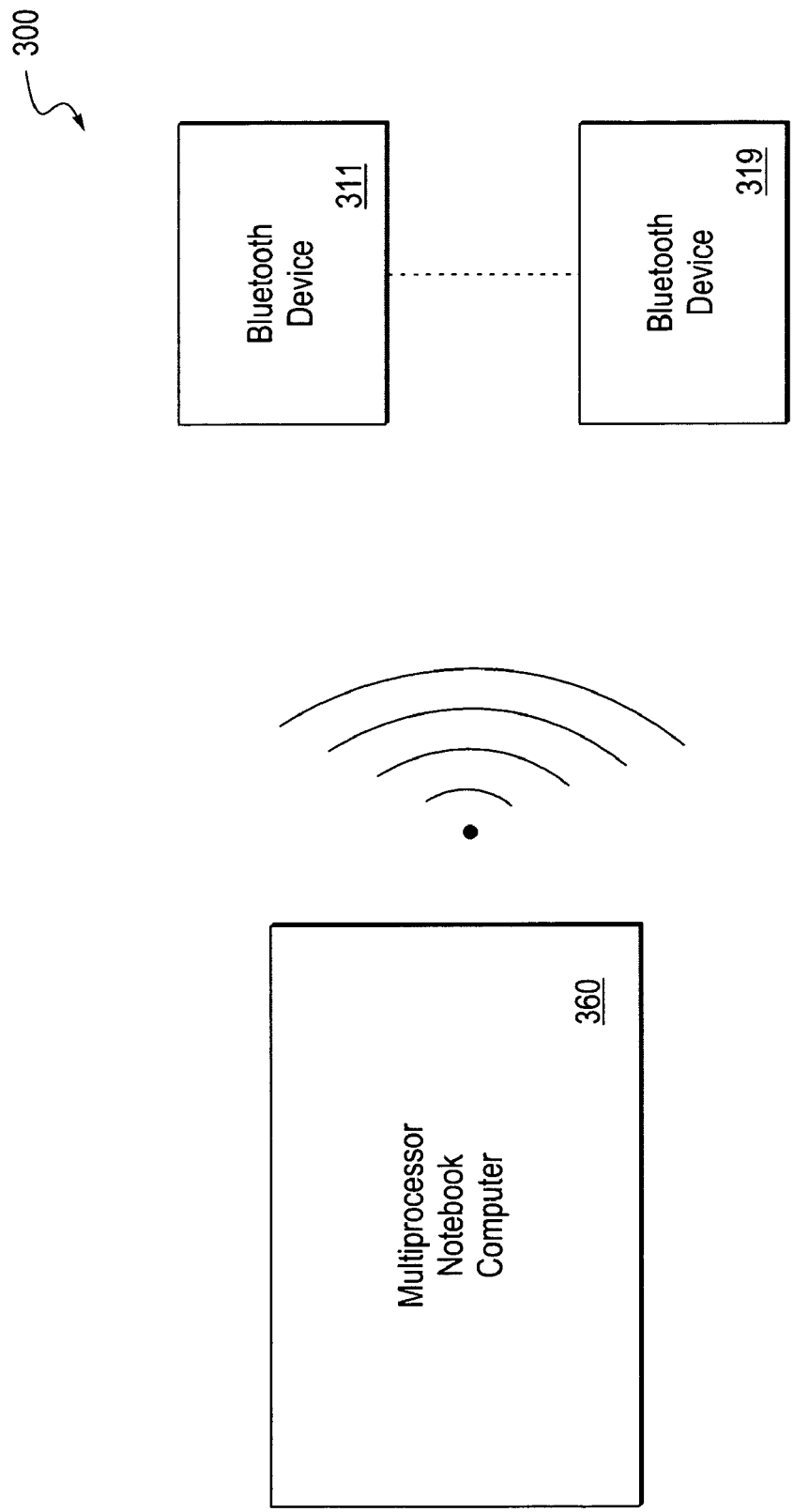
FIG. 3 illustrates an exemplary diagram of a Bluetooth network, according to another embodiment of the present invention.

FIG. 3 illustrates an exemplary diagram of a Bluetooth network 300, according to another embodiment of the present invention. Bluetooth network 300 includes a multi-processor computer 360 that communicates with Bluetooth devices 311-319. Multiprocessor computer 360 can operate in various states.

Computing system 360 has three primary states were useful tasks can be performed: 1) a high power, "normal on" state; 2) a "main CPU/OS based low power" state; and, 3) a "non main CPU/OS based low power" state.

The "normal on" state corresponds to a standard "normal on" state in which the computing system is operational and all of its primary architectural components are powered on. As a consequence, the computing system can be viewed as being within a "high power" state because its primary architectural components are consuming power.

The "main CPU/OS based low power" state corresponds to a state in which the main CPU is powered on and can execute software; yet, primary architectural components (notably, the graphics controller, the display, and various I/O units are powered down so that power consumption is reduced. Moreover, the main CPU itself, although functional, may be configured so as to have reduced performance and reduced power consumption as compared to the normal on state. In an embodiment, this is achieved at least by lowering the frequency of the main CPU's clock speed as compared to the "normal on" state. As a consequence, the main CPU has reduced processing speed, but, consumes less power.

The "non main CPU/OS based lower power" state corresponds to a state in which the main CPU is powered down so that it cannot execute software based upon the computing system's main OS. Note that the cache, the system memory, and at least the memory controller portion of the memory controller and bridge unit may also be powered down (because they largely support the main CPU's efforts to execute software).

In lower power state, wireless I/O is still powered on. Wireless I/O can use many long and/or short range protocols. While long-range wireless standards may be available and defined, the near proximity use of near and even co-located devices wants for the development of a short-range wireless standard. One such short-range wireless standard that is in the process of being embraced is preliminarily known by the name of "Bluetooth." Bluetooth, which is only one example of a short-range wireless standard, is actually a combination of specialized computer chips and software. Bluetooth is the name for a technology specification for small form factor, low-cost, short-range radio links between mobile PDAs, PCs, mobile phones and other portable devices which is published by the Bluetooth SIG Inc (see www.bluetooth.com) and standardized by the IEEE as 802.15.1. Bluetooth, for example, also offers speedy transmission of up to one megabyte per second, over 17 times as fast as a typical modem. One of the present Bluetooth specification restrictions is to limit the transmission range so that the resulting radiation pattern typically does not exceed 10 meters.

Additional short-range wireless standards include the IEEE 802.11 RF wireless standards: 802.11 HR, 802.11b, and 802.11@5 GHz standards. Other exemplary short-range wireless standards potentially useful with the present invention include: HiperLan, HiperLan II, HomeRF, SWAP, OpenAir, and other wireless protocols.

Figure 4:
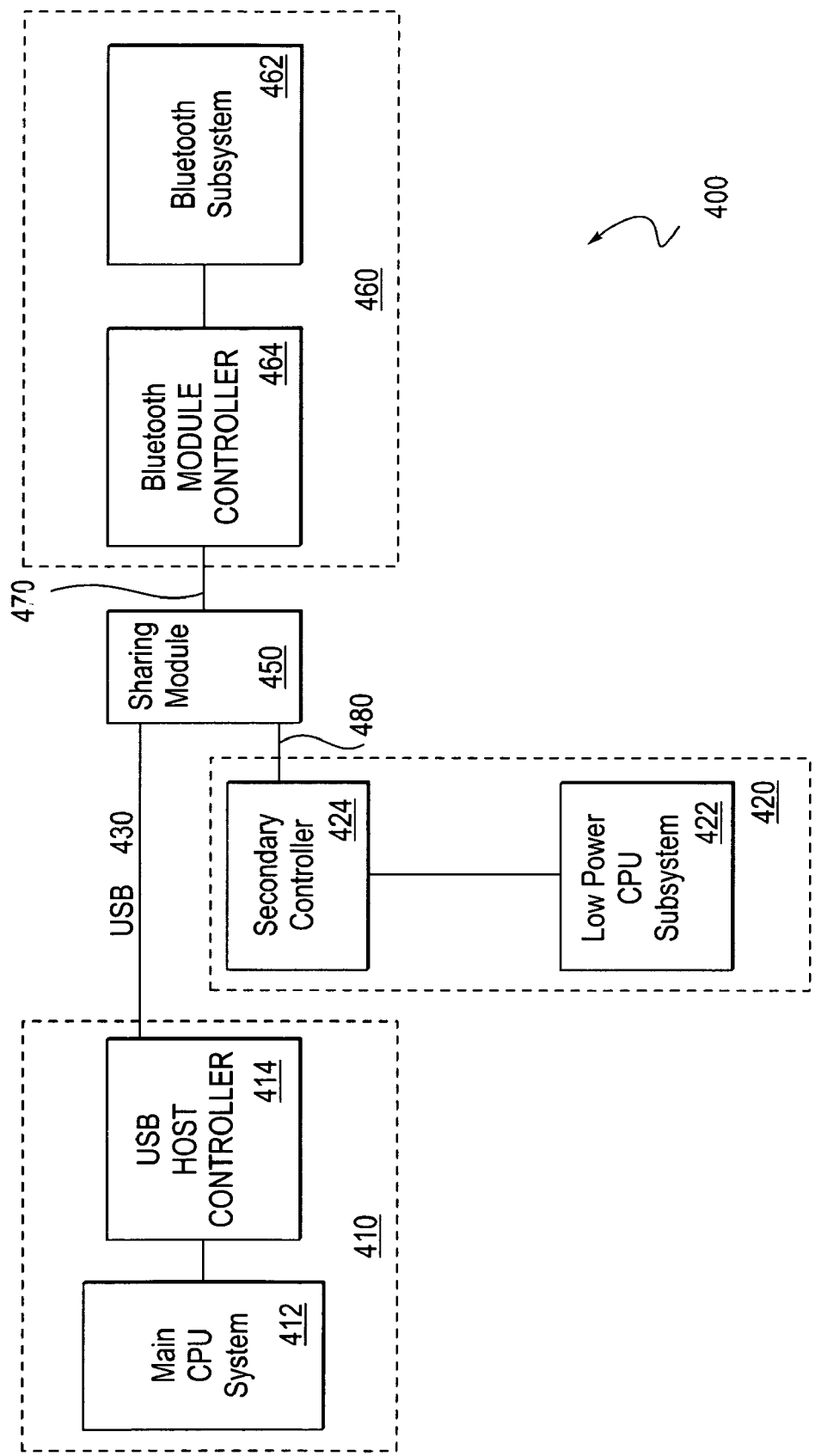
FIG. 4 illustrates an exemplary multi processor computer system architecture, according to one embodiment of the present invention.

FIG. 4 illustrates an exemplary multi processor computer system architecture 400, according to one embodiment of the present invention. Multi-processor system 400 includes main processing module 410 that includes a USB host controller 414 and main CPU system 412. Main CPU subsystem 412 can include Pentium,™ Celleron™ or similar multi-function IA32 microprocessors. Main CPU subsystem 412 can use the Windows™ operating system. Main processing module 410 is connected to sharing module 450 via USB link 430 according to one embodiment. Additionally, main processing module functions in high power state and main CPU/OS based low power state described above.

Multi-processor system 400 also includes a secondary processing module 420 includes a secondary controller 424 and low power CPU. Low power CPU Subsystem 422 can include Xscale™ or similar low power microprocessors. Low power CPU subsystem 422 can use the Windows CE™ operating systems Palm™ operating system, or similar operating system. Secondary controller 424 is connected to sharing module 450 via a Universal Asynchronous Receiver/Transmitter(UART) interface 480, according to one embodiment. Additionally, subsystem 422 can operate in all three states above, but would only be a master of the Bluetooth module 460, while multi-processor systems 400 is in a lower power state as described above.

Multi-processor system includes sharing module 450, as described above, that allows for main processing module 410 and secondary system 420 to share Bluetooth module 460. Sharing module translate packets in formats of main processing system 420 and secondary system 420, into modes used by Bluetooth module 460. Additionally, sharing module 470 presents Bluetooth module 460 as a peripheral slave device to both main system 410 and secondary system 420. Sharing module 470 also functions as a switch to determine whether main system 410 or secondary system 420 should control the Bluetooth module 460 based on the overall power state of multiprocessor computer system 400. The switching decisions are made by sharing module 470 for numerous reasons. For example, the switch can occur when the notebook computer's lid is opened or closed; or if the computer receives a data message (e-mail, SMS, MMS, etc.). The switching is performed seamlessly.

Bluetooth module 460 includes a controller 464 and a Bluetooth subsystem 462. The Bluetooth module 460 is a stand Bluetooth radio module, such as those sold by Zeevo.

Figure 5:
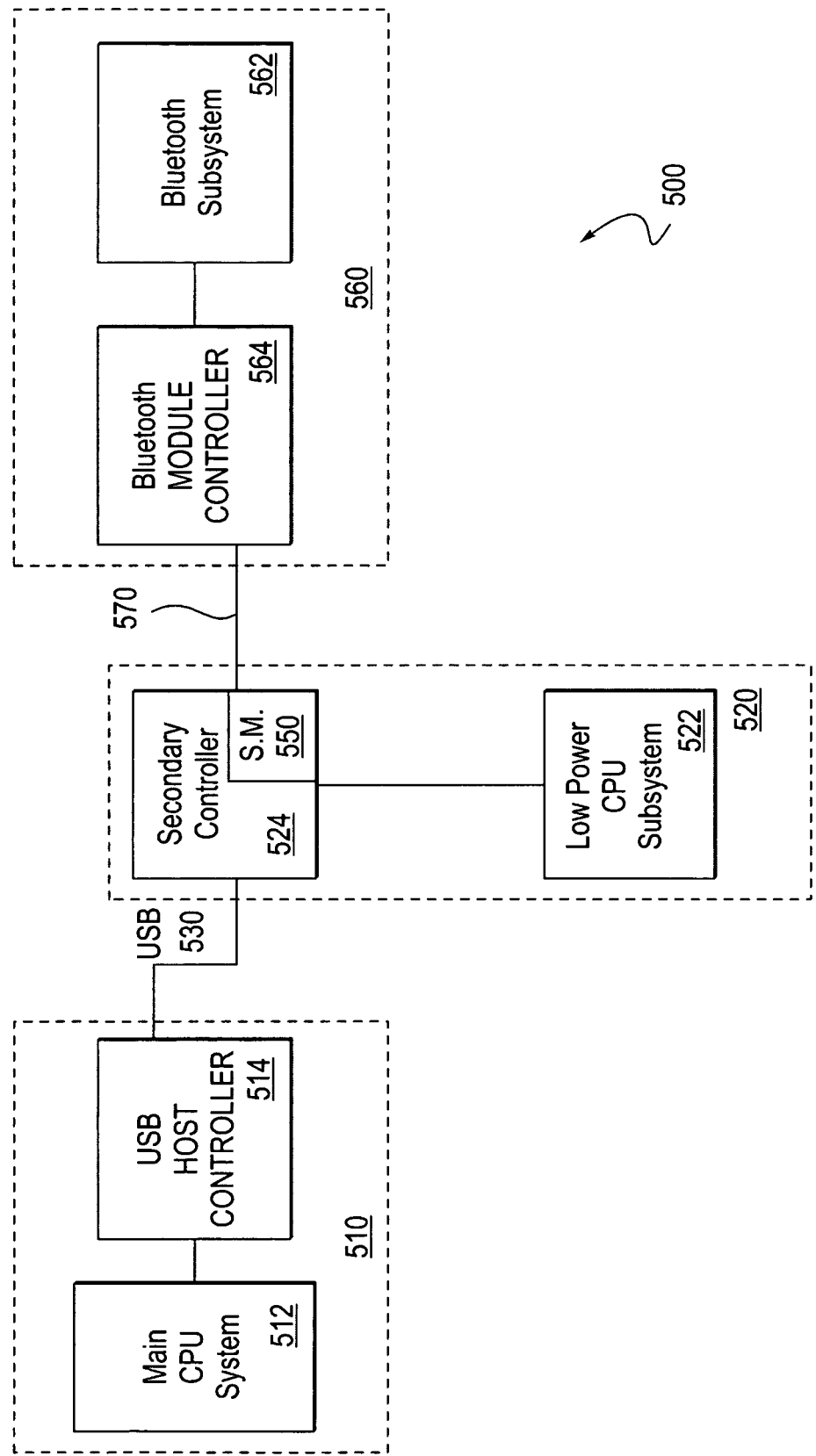
FIG. 5 illustrates an exemplary multi-processor computer system architecture, according to another embodiment of the present invention.

FIG. 5 illustrates an exemplary multiprocessor computer system architecture 500, according to another embodiment of the present invention. Main processor system 510 includes main CPU system 512 and USB host controller 514. Multiprocessor system 500 integrates sharing module 550 into secondary controller 524 of secondary processing system 520.

Bluetooth module 560 includes both a host controller 564 and subsystem 562. Secondary controller 524 interfaces with both Bluetooth module 560 and main processor system 510. The interface with main processor system 510 is USB 530 and the interface with Bluetooth module is UART 570. Secondary controller 524 can be active in all power states of multiprocessor system 500. While in high power state, and low power main CPU/OS on states, secondary controller acts as a slave and the main processor system 510 will control the Bluetooth module 560. Once, the lower power state is entered, low power subsystem 522 acts as a master, to control Bluetooth module 560.

Figure 6:
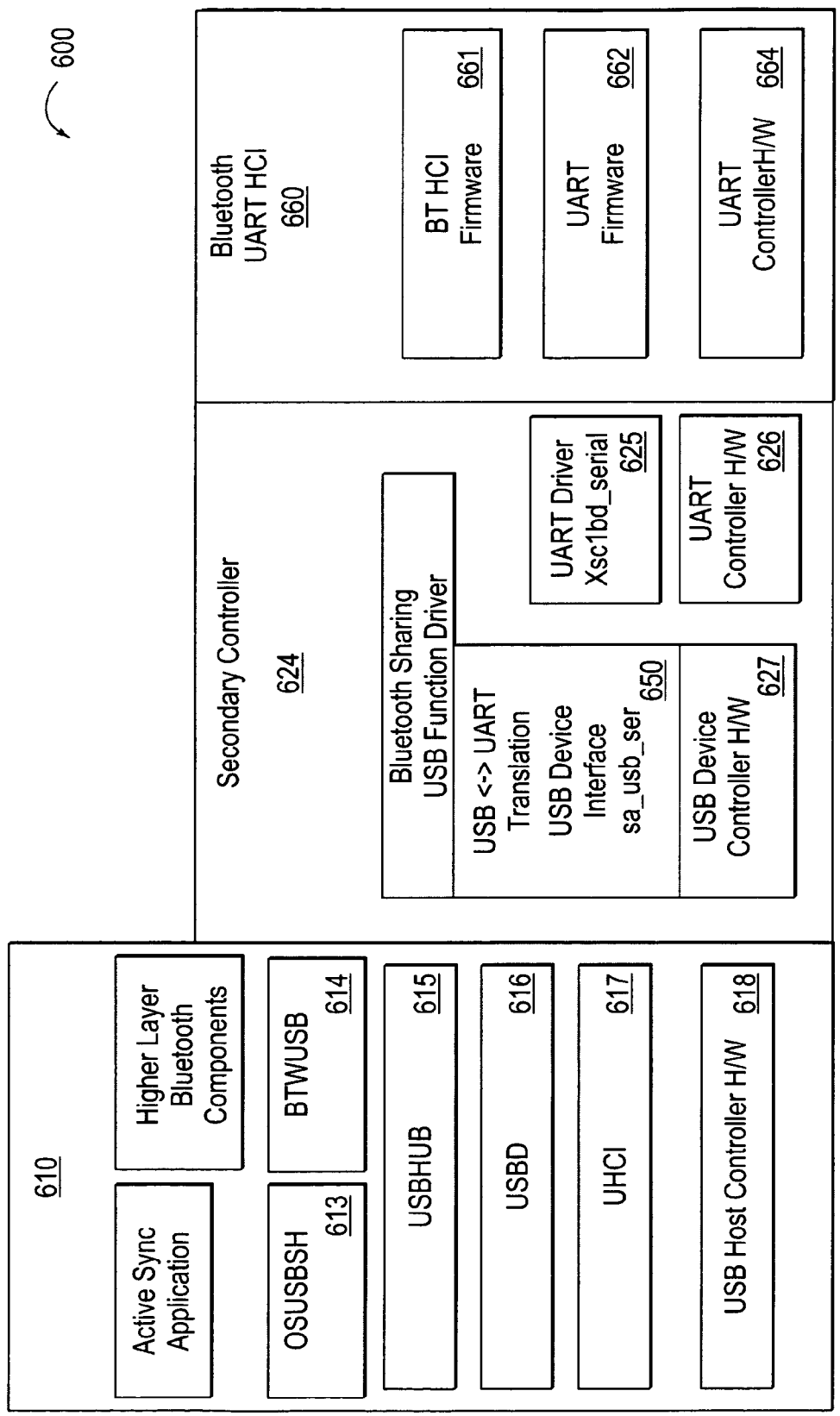
FIG. 6 illustrates an exemplary detailed diagram of a multiprocessor system for sharing a Bluetooth peripherals according to one embodiment of the present invention.

FIG. 6 illustrates an exemplary detailed diagram of a multiprocessor system 600 for sharing a Bluetooth peripherals, according to one embodiment of the present invention. Main Processor system 610 includes USB host controller hardware 618, which communicates with secondary system's USB device controller hardware 627. Main system 610 also includes standard USB host controller interface (UHCI) 617, USB driver (USBD) 616, and USB hub 615. System 610 also includes a USB serial host protocol descriptor 613 (OSUSBSH) such as for Windows CE™. Additionally, system 610 includes Bluetooth USB protocol definitions 614 specific to the operating system of main processor 610. The operating system can be Windows™, Linux or similar system.

Secondary controller 624 includes USB device controller hardware 627 to interface with USB host controller 618, as well as UART controller hardware 626 to interface with Bluetooth UART controller hardware 664. Secondary controller 624 provides a UART driver 625 and a sharing USB Function driver 650. The sharing driver 650 translates USB descriptors to UART descriptors, as well as providing a USB driver, for use by hardware 627. Driver 650 extends USB descriptor configuration to support proprietary data communication applications. Bluetooth UART Host Controller Interface 660 includes Bluetooth firmware 661, UART firmware 662 and a UART hardware controller 664.

The embodiment of FIG. 6 does not necessitate any changes to the main processor's 610 operating system. Nor, is there a dependency on proprietary drivers, or effect on application functionality run on main system 610. Higher layer Bluetooth components remain unchanged as well.

Figure 7:
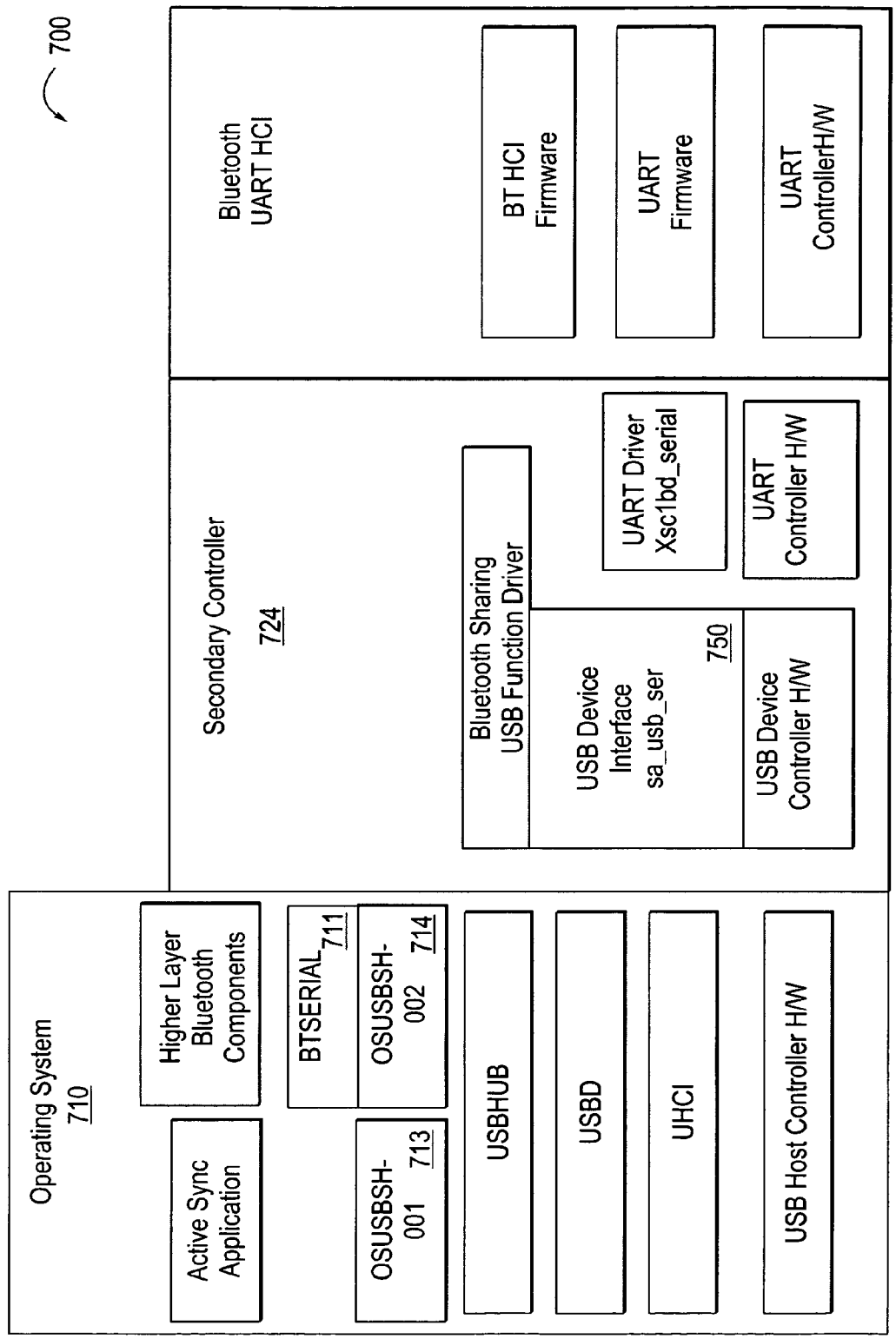
FIG. 7 illustrates an exemplary detailed diagram of a multiprocessor system, for sharing a Bluetooth peripheral according to another embodiment of the present invention.

FIG. 7 illustrates an exemplary detailed diagram of a multiprocessor system 700, for sharing a Bluetooth peripheral according to another embodiment of the present invention. The functional components of system 700 are similar to those illustrated in FIG. 6. However, system 700 utilizes a second USB serial host protocol state with Bluetooth Serial descriptors 711. Such a configuration allows for USB Function driver 750 in Secondary controller 724 to not need to perform USB/UART translation, thus resulting in no packet based processing at secondary controller 724.

Figure 8:
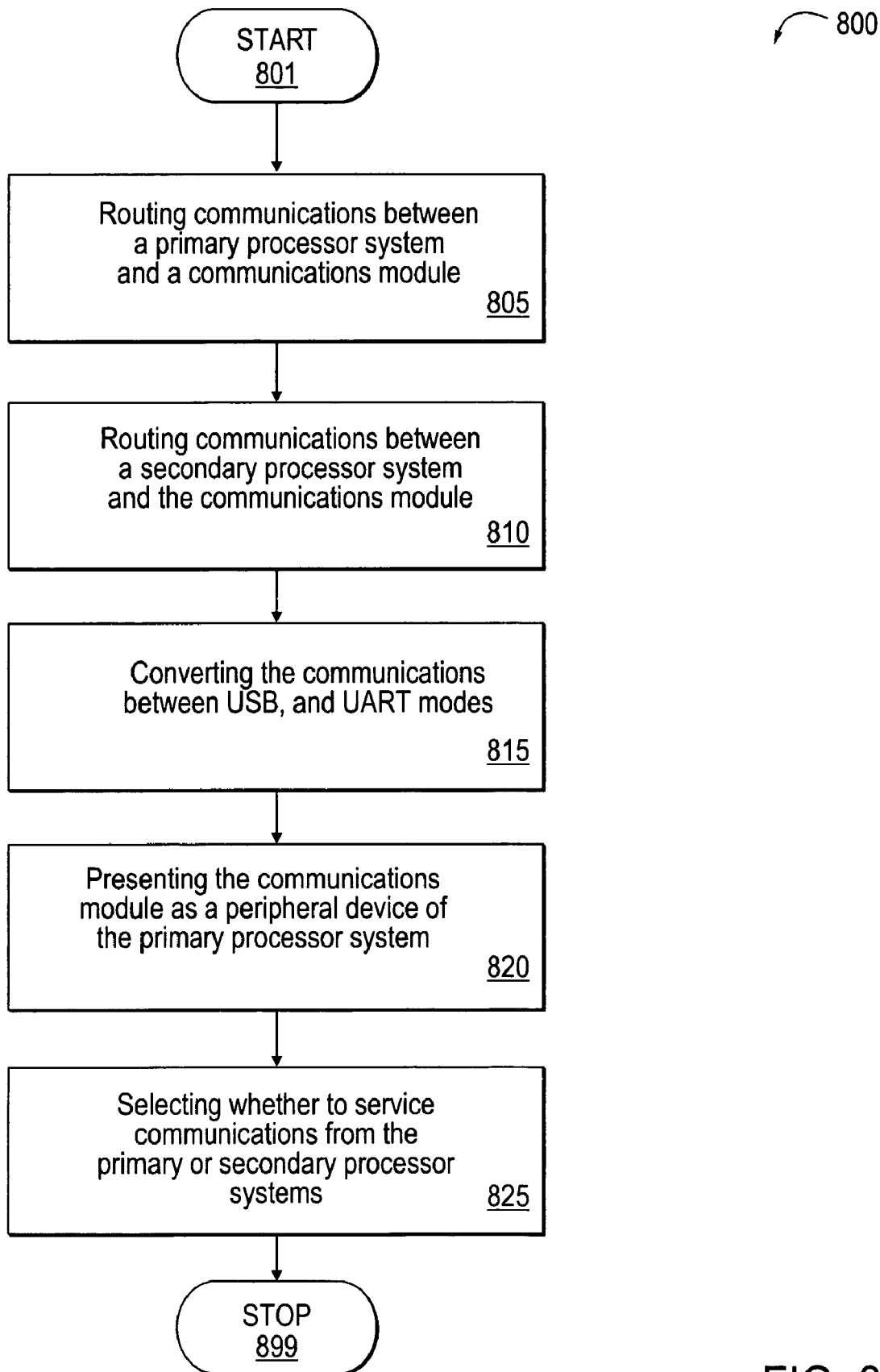
FIG. 8 illustrates an exemplary flow diagram of a method performed for sharing a Bluetooth peripheral, according to one embodiment of the present invention.

FIG. 8 illustrates an exemplary flow diagram 800 of a method performed for sharing a Bluetooth peripheral, according to one embodiment of the present invention. The process commences at block 801. At processing block 805, the sharing module routes communications between a primary processor system and a Bluetooth communication module. At processing block 810, the sharing module routes communications between a secondary processor system and the Bluetooth module.

The communications packets are processed to properly translate transport protocols between USB and UART; at processing block 815, if necessary. At processing block 820, the Bluetooth module is presented to the main processing system as a USB peripheral device. The sharing module also selects and switches control of the Bluetooth module between the main processor system and secondary system based on the overall power state of the multiprocessor computer system.

A method and apparatus for sharing a Bluetooth module with two computing devices is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method, comprising: sharing control of a Bluetooth communications module between a primary processor system and a secondary processor system, wherein sharing control comprises:
   routing Bluetooth communications between the primary processor system and the Bluetooth communications module via a sharing module; and
   routing Bluetooth communications between the secondary processor system and the Bluetooth communications module via the sharing module;
   wherein the sharing module does not modify software running on the primary processor system.

2. The method of claim 1, wherein sharing control further comprises:
   presenting the Bluetooth communications module as a slave device; and
   presenting the primary processor system and secondary processor system as master devices to the Bluetooth communications module.

3. The method of claim 1, wherein sharing control further comprises selecting whether to service Bluetooth communications either of the primary processor system or the secondary processor system.

4. The method of claim 1, wherein sharing control further comprises:
   converting all Bluetooth packets between a first transport mode and a second transport mode.

5. The method of claim 4, wherein the first transport mode includes a universal serial bus (USB), an RS-232 connection, Firewire, and mPCI; and
   wherein the second transport mode includes a universal serial bus (USB), an RS-232 connection, Firewire, and mPCI.

6. The method of claim 5, wherein the sharing module is integrated into the secondary processor system; and
   wherein the secondary processor system is a low-power computer system and the primary processor system is a main CPU/OS computer system.

7. The method of claim 5, wherein the sharing module is integrated into the secondary processor system, and the secondary processor system is a multi-function Bluetooth enabled device; and
   wherein the primary processor system includes a notebook, a tablet, a laptop, and a desktop computer system.

8. The method of claim 7, wherein the sharing module is integrated with a secondary controller of the secondary processor system.

9. The method of claim 5, wherein the sharing module is included in the primary processor system.

10. The method of claim 1, wherein the communications module, the primary processor system and the secondary processor system are included in a notebook computer.

11. The method of claim 1, wherein the Bluetooth module communicates with one or more secondary Bluetooth devices.

12. The method of claim 1, wherein the sharing module communicates with a USB host controller and a Bluetooth controller.

13. The method of claim 1, further comprising switching control between the primary processor system and secondary processor system, upon the occurrence of an event, wherein the event includes opening of a computer lid, receiving a data message by the first processor system, receiving a data message by the second processor system, closing a computer lid, and receiving a switch command.

14. A system, comprising:
   means for sharing control of a Bluetooth communications module between a primary processor system and a secondary processor system having means for routing Bluetooth communications between the primary processor system and the Bluetooth communications module via a sharing module and means for routing Bluetooth communications between the secondary processor system and the Bluetooth communications module via the sharing module, wherein the sharing module does not modify software running on the primary processor system.

15. The system of claim 14, wherein sharing control further comprises:
   means for presenting the Bluetooth communications module as a slave device; and
   means for presenting the primary processor system and secondary processor system as master devices to the Bluetooth communications module.

16. The system of claim 14, wherein sharing control further comprises means for selecting whether to service either Bluetooth communications of the primary processor system or the secondary processor system.

17. The system of claim 14, wherein sharing control further comprises:
   means for converting Bluetooth data packets between a first transport mode and a second transport mode.

18. The system of claim 17, wherein the first transport mode includes a universal serial bus (USB), an RS-232 connection, Firewire, and mPCI; and
   wherein the second transport mode includes a universal serial bus (USB), an RS-232 connection, Firewire, and mPCI.

19. The system of claim 18, wherein the sharing module is integrated into the secondary processor system; and
   wherein the secondary processor system is a low-power computer system and the primary processor system is a main CPU/OS computer system.

20. The system of claim 18, wherein the sharing module is integrated into the secondary processor system, and the secondary processor system is a multi-function Bluetooth enabled device; and
   wherein the primary processor system includes a notebook, a tablet, a laptop, and a desktop computer system.

21. The system of claim 20, wherein the sharing module is integrated with a secondary controller of the secondary processor system.

22. The system of claim 18, wherein the sharing module is included in the primary processor system.

23. The system of claim 14, wherein the communications module, the primary processor system and the secondary processor system are included in a notebook computer.

24. The system of claim 14, wherein the Bluetooth module communicates with one or more secondary Bluetooth devices.

25. The system of claim 14, wherein the sharing module communicates with a USB host controller and a Bluetooth controller.

26. The system of claim 14, further comprising means for switching control between the primary processor system and secondary processor system, upon the occurrence of an event, wherein the event includes opening of a computer lid, receiving a data message by the first processor system, receiving a data message by the second processor system, closing a computer lid, and receiving a switch command.

27. A computer-readable medium having stored thereon a plurality of instructions, said plurality of instructions when executed by a computer, cause said computer to perform:
   sharing control of a Bluetooth communications module between a primary processor system and a secondary processor system;
   routing Bluetooth communications between the primary processor system and the Bluetooth communications module via a sharing module; and
   routing Bluetooth communications between the secondary processor system and the Bluetooth communications module via the sharing module;
   wherein the sharing module does not modify software running on the primary processor system.

28. The computer-readable medium of claim 27, having stored thereon additional instructions, said additional instructions when executed by a computer, cause said computer to further perform:
   presenting the Bluetooth communications module as a slave device; and
   presenting the primary processor system and secondary processor system as master devices to the Bluetooth communications module.

29. The computer-readable medium of claim 27, having stored thereon additional instructions, said additional instructions when executed by a computer, cause said computer to further perform selecting whether to service either Bluetooth communications of the primary processor system or the secondary processor system.

30. The computer-readable medium of claim 27, having stored thereon additional instructions, said additional instructions when executed by a computer, cause said computer to further perform converting Bluetooth data packets between a first transport mode and a second transport mode.

31. The computer-readable medium of claim 30, wherein the first transport mode includes a universal serial bus (USB), an RS-232 connection, Firewire, and mPCI; and
   wherein the second transport mode includes a universal serial bus (USB), an RS-232 connection, Firewire, and mPCI.

32. The computer-readable medium of claim 31, wherein the sharing module is integrated into the secondary processor system; and
   wherein the secondary processor system is a low-power computer system and the primary processor system is a main CPU/OS computer system.

33. The computer-readable medium of claim 31, wherein the sharing module is integrated into the secondary processor system, and the secondary processor system is a multi-function Bluetooth enabled device; and
   wherein the primary processor system includes a notebook, a tablet, a laptop, and a desktop computer system.

34. The computer-readable medium of claim 33, wherein the sharing module is integrated with a secondary controller of the secondary processor system.

35. The computer-readable medium of claim 31, wherein the sharing module is included in the primary processor system.

36. The computer-readable medium of claim 27, wherein the communications module, the primary processor system and the secondary processor system are included in a notebook computer.

37. The computer-readable medium of claim 27, wherein the Bluetooth module communicates with one or more secondary Bluetooth devices.

38. The computer-readable medium of claim 27, wherein the sharing module communicates with a USB host controller and a Bluetooth controller.

39. The computer-readable medium of claim 27, having stored thereon additional instructions, said additional instructions when executed by a computer, cause said computer to further perform switching control between the primary processor system and secondary processor system, upon the occurrence of an event, wherein the event includes opening of a computer lid, receiving a data message by the first processor system, receiving a data message by the second processor system, closing a computer lid, and receiving a switch command.

40. A apparatus, comprising:
   a Bluetooth sharing module;
   a Bluetooth communications module connected to the Bluetooth sharing module;
   a primary processor system connected to the Bluetooth sharing module; and
   a secondary processor system connected to the Bluetooth sharing module,
   wherein the Bluetooth sharing module is configured to allow the primary processor system and secondary processor system to share control of the Bluetooth communications module via a host controller of the Bluetooth communications module, further wherein the sharing module routes Bluetooth communications between the primary processor system and the Bluetooth communications module via a sharing module, routes Bluetooth communications between the secondary processor system and the Bluetooth communications module via the sharing module and does not modify software running on the primary processor system.

41. The apparatus of claim 40, wherein the sharing module
   presents the Bluetooth communications module as a slave device; and
   presents the primary processor system and secondary processor system as master devices to the Bluetooth communications module.

42. The apparatus of claim 40, wherein the sharing module selects wheter to service Bluetooth communications either of the primary processor system or the secondary processor system.

43. The apparatus of claim 40, wherein the sharing module converts all Bluetooth packets between a first transport mode and a second transport mode.

44. The apparatus of claim 43, wherein the first transport mode includes a universal serial bus (USB), an RS-232 connection, Firewire, and mPCI; and wherein the second transport mode includes a universal serial bus (USB), an RS-232 connection, Firewire, and mPCI.

45. The apparatus of claim 44, wherein the sharing module is integrated into the secondary processor system; and wherein the secondary processor system is a low-power computer system and the primary processor system is a main CPU/OS computer system.

46. The apparatus of claim 44, wherein the sharing module is integrated into the secondary processor system, and the secondary processor system is a multi-function Bluetooth enabled device; and wherein the primary processor system includes a notebook, a tablet, a laptop, and a desktop computer system.

47. The apparatus of claim 46, wherein the sharing module is integrated with a secondary controller of the secondary processor system.

48. The apparatus of claim 44, wherein the sharing module is included in the primary processor system.

49. The apparatus of claim 40, wherein the sharing module, the primary processor system and the secondary processor system are included in a notebook computer.

50. The apparatus of claim 40, wherein the Bluetooth module communicates with one or more secondary Bluetooth devices.

51. The apparatus of claim 40, wherein the sharing module communicates with a USB host controller and a Bluetooth controller.

52. The apparatus of claim 40, wherein the sharing module switches control of the Bluetooth controller between the primary processor system and secondary processor system, upon the occurrence of an event, wherein the event includes opening of a computer lid, receiving a data message by the first processor system, receiving a data message by the second processor system, closing a computer lid, and receiving a switch command.

53. An apparatus, comprising:
a universal serial bus (USB) hardware interface;
a Bluetooth sharing module coupled to the universal serial bus hardware interface, the sharing module to share control of a Bluetooth communications module between a primary processor system and a secondary processor system; and
a UART hardware interface coupled to the Bluetooth sharing module.

54. The apparatus of claim 53, wherein the Bluetooth sharing module includes:
a UART serial driver to receive and send Bluetooth data packets with the UART hardware interface; and
a USB function driver to receive and send the Bluetooth data packets with the USB hardware interface.

55. The apparatus of claim 54, wherein the USB function driver includes a protocol translator to translate between USB and UART.

* * * * *

UNITED STATES PATENT AND TRADEMARK OFFICE
CERTIFICATE OF CORRECTION

| | | |
|---|---|---|
| PATENT NO. | : 7,263,331 B2 | Page 1 of 1 |
| APPLICATION NO. | : 10/663196 | |
| DATED | : August 28, 2007 | |
| INVENTOR(S) | : Gupta et al. | |

It is certified that error appears in the above-identified patent and that said Letters Patent is hereby corrected as shown below:

In column 1, at line 48, delete "108," and insert --$108_1$--.

In column 5, at line 31, after "420" insert --that--.

In column 5, at line 32, after the first occurrence of "CPU" insert --subsystem 422.--.

In column 5, at line 35, delete "systems" and insert --system--.

In column 5, at line 41, delete "systems" and insert --system--.

Signed and Sealed this

Eighth Day of April, 2008

JON W. DUDAS
*Director of the United States Patent and Trademark Office*